United States Patent
Schiller

(10) Patent No.: US 8,085,297 B2
(45) Date of Patent: Dec. 27, 2011

(54) METHOD FOR MODIFYING A USER INTERFACE OF A CONSUMER ELECTRONIC APPARATUS, CORRESPONDING APPARATUS, SIGNAL AND DATA CARRIER

(75) Inventor: Harald Schiller, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 3465 days.

(21) Appl. No.: 10/145,291

(22) Filed: May 14, 2002

(65) Prior Publication Data

US 2002/0174432 A1  Nov. 21, 2002

(51) Int. Cl.
*H04N 7/00* (2011.01)
(52) U.S. Cl. ............. 348/114; 725/37; 725/52; 725/152
(58) Field of Classification Search ............... 725/24, 725/50, 51
See application file for complete search history.

(56) References Cited

U.S. PATENT DOCUMENTS

| | | | | |
|---|---|---|---|---|
| 4,829,558 A | * | 5/1989 | Welsh | 379/92.04 |
| 5,508,731 A | * | 4/1996 | Kohorn | 725/24 |
| 6,407,779 B1 | * | 6/2002 | Herz | 348/734 |
| 6,453,471 B1 | | 9/2002 | Klosterman | |
| 6,512,919 B2 | | 1/2003 | Ogasawara | |

FOREIGN PATENT DOCUMENTS

| | | |
|---|---|---|
| EP | 0496492 | 7/1992 |
| EP | 0823815 | 2/1998 |
| EP | 0851681 | 7/1998 |
| EP | 0 863 669 A1 * | 9/1998 |
| EP | 0863699 | 9/1998 |
| EP | 1079371 | 2/2001 |
| WO | WO98/41020 | 9/1998 |

OTHER PUBLICATIONS

European Search Report of Oct. 10, 2001.

* cited by examiner

*Primary Examiner* — James R Sheleheda
*Assistant Examiner* — Timothy Newlin
(74) *Attorney, Agent, or Firm* — Robert D. Shedd; Joseph J. Opalach; Catherine A. Cooper

(57) ABSTRACT

According to the invention a user interface of a consumer electronic apparatus is modified, which can be used for example to update a given basic UI functionality or to temporarily implement isolated, dedicated UI sub-domains. For this purpose side information is received comprising side information components for controlling the user interface and validity information defining the validity start and/or end time of the side information components. The side information components and validity information is stored and the user interface is modified by using said stored side information components. The start time and/or end time of the user interface modification is controlled by means of said stored validity information.

17 Claims, 1 Drawing Sheet

METHOD FOR MODIFYING A USER INTERFACE OF A CONSUMER ELECTRONIC APPARATUS, CORRESPONDING APPARATUS, SIGNAL AND DATA CARRIER

FIELD OF THE INVENTION

The invention relates to a method for modifying a user interface of a consumer electronic apparatus. The invention furthermore relates to an apparatus in which the method for modifying a user interface of a consumer electronic apparatus is employed and to a corresponding signal and data carrier.

BACKGROUND OF THE INVENTION

In general terms a user interface (UI) includes all aspects of an apparatus or a program, which are used for an interaction with a user. This includes commands and mechanisms, which the user utilizes to control the operation of the apparatus or program and to input data but also an output by the apparatus or program, which can be seen or heard or otherwise perceived by the user.

Especially for consumer electronic apparatuses and computer systems a wide range of user interfaces has been developed and implemented. A very simple and today in many areas outdated user interface requires the user to type textual commands by using a keyboard and produces a single stream of text as output. More comfortable are graphical user interfaces, which use for the output displayed windows, pictures or icons and for the input and control a cursor moved over the display using "up"- and "down"-keys or a pointing device such as a mouse, a trackball or a touch-pad. Even more sophisticated is a voice-controlled user interface based on speech recognition. However, a drawback of these user interfaces is that they are defined and fixed once the respective apparatus has left the factory which means that no extensions or corrections are possible.

SUMMARY OF THE INVENTION

It is one object of the invention to disclose a method for modifying a user interface of a consumer electronic apparatus, which can be used for example to update a given basic UI functionality or to temporarily implement isolated, dedicated UI sub-domains. This object is achieved by the method disclosed in claim 1.

The method according to the invention comprises:
receiving side information comprising side information components for controlling said user interface and validity information defining the validity of said side information components;
storing said side information components and said validity information;
modifying said user interface by using said stored side information components; and
controlling the start time and/or end time of said user interface modification by means of said stored validity information.
This allows to modify the UI of the device itself by using the side information for variable duration.

A corresponding apparatus for performing the inventive method is specified in Claim 13, a corresponding computer readable medium is specified in claim 17, respectively.

Advantageous additional embodiments of the invention are disclosed in the respective dependent claims.

BRIEF DESCRIPTION OF THE DRAWINGS

Features and advantages of the present invention will become apparent upon further consideration of the following detailed description of the invention when read in conjunction with the illustration of a block diagram of an embodiment of the present invention.

DETAILED DESCRIPTION OF PREFERRED EMBODIMENTS

Figure 1:
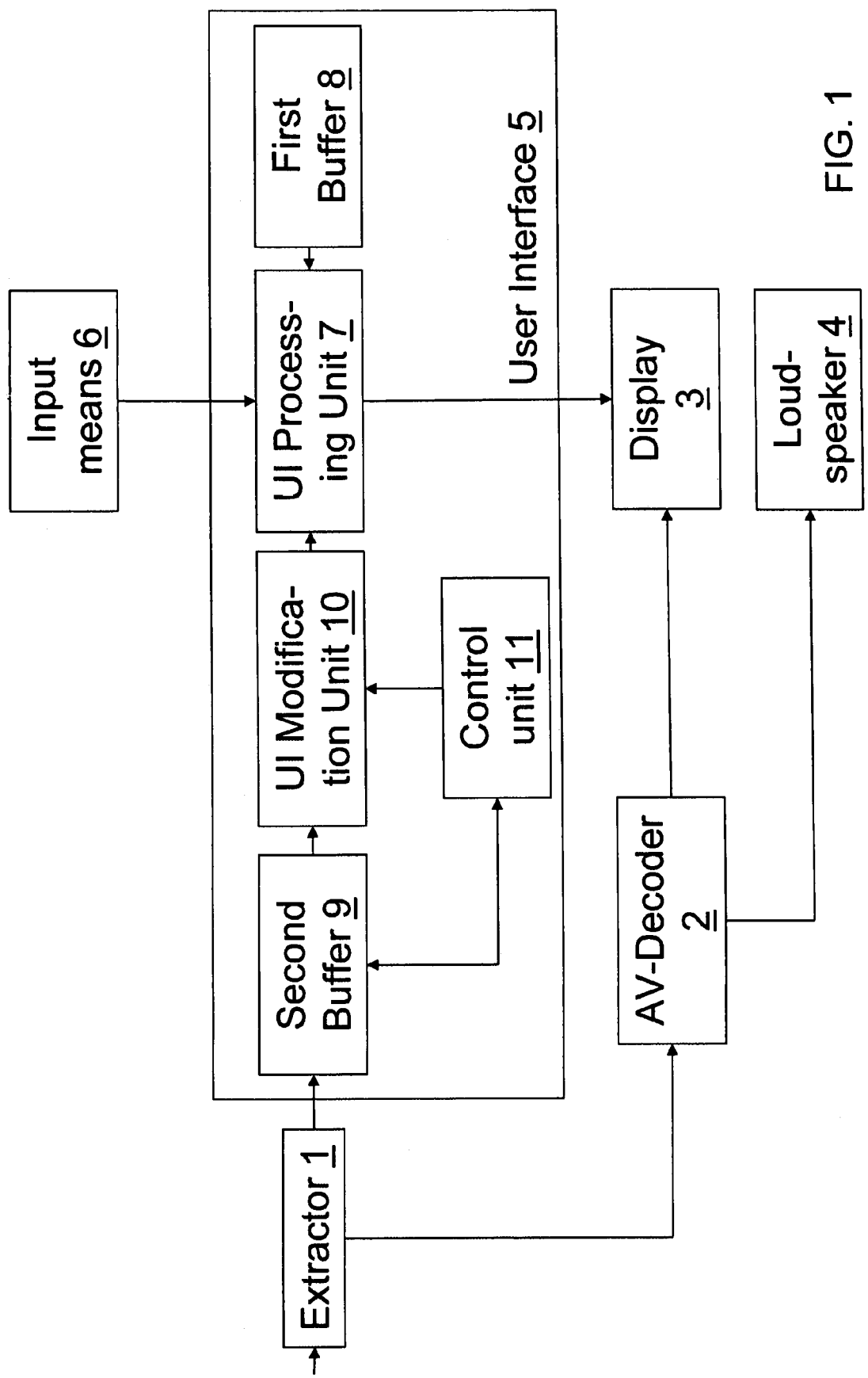

FIG. 1 illustrates a block diagram of an embodiment of the present invention. A received signal consisting of main data and embedded side information is supplied to an extractor 1. The main data may be AV data or pure video or audio data, either in analog or digital form, e.g. compressed according to the MPEG-2 standard. In the case of an analog TV signal the side information can be received embedded in the vertical blanking interval and can be separated by a suited data slicer, which may also be used for the separation of other VBI data like teletext, VPS or closed caption. For a digital TV signal the side information may be embedded in a corresponding data channel, e.g. in not used user-data and can be separated by a suited demultiplexer. After separation of the side information from the main data the main data are forwarded to suited processing means 2, e.g. an MPEG-2 decoder, and are finally played-back using a display 3 and/or one or more loudspeakers 4.

A user interface unit 5 controls the interaction between the user and the apparatus, e.g. the display of a graphical UI and the input of commands by the user using a mouse-controlled cursor. The user interface unit 5 comprises user command input means 6 for receiving the user inputs, a processing unit 7 for handling the commands and mechanisms of the UI and a first buffer 8 for the permanent storage of parameters for UI parts, which shall be kept unaltered. Furthermore, a second buffer 9, a modification unit 10 and a control unit 11 are implemented for the purpose of modifying the UI according to the invention. The second buffer 9 receives from the extractor 1 the side information comprising side information components for controlling the user interface and validity information defining the validity start and/or end time of said side information components, which both are stored in the buffer 9. The side information components and validity information are fed to the modification unit 10, which processes these data and modifies the UI when the start time of the respective side information component is signalized by the control unit 11, possibly together with the processing unit 7. When the end time of the side information component is reached, this is also signalised by the control unit 11 and the modification is reversed.

In a further embodiment the side information is written into the first buffer 8 and kept there for the duration of the UI modification instead of writing the side information into the second buffer 9. In this way the costs for the additional buffer 9 can be saved.

Instead or in addition to the inputs by using a cursor or by button selection from a visual menu the UI may also provide the possibility to make requests by voice.

The side information can be used to modify the visual appearance of the UI, e.g. to insert additional buttons with a new functionality or to create new subdirectories with additional commands. In case of voice control, the additional user commands are new keywords to be recognized by the speech recognition algorithm, which may be stored as pieces of PCM waveform or in a time-parameter domain. Also, for a user interface including voice synthesis the side information can be used to alter the parameter sets for the voice synthesis, e.g. to add new speech keywords or to change the sound of the voice.

The side information can be received together with AV data, especially embedded into AV data, from a broadcasting station. However, the AV data and the side information can also be supplied by a data carrier, e.g. an optical storage disc like a DVD disc. Furthermore, the side information can also be received on a separate input channel, e.g. a telephone line.

The user interface can be implemented and shown on the operated consumer electronic apparatus itself but can also be implemented on a further device connected to the controlled apparatus, e.g. via a digital home network.

There are many possible applications for the present invention. The following describes exemplarily one of these for a user watching a television game show. At the game show several teams or candidates compete. After several tasks to be solved by the candidates the television viewers are asked to vote in order to determine the winner of the game show. For this purpose keywords assigned to the respective candidates are transmitted as side information, e.g. the "blue team", "red team" and "yellow team". These keywords are set valid for the voting time duration and can appear as a table in a user-callable menu or can be added to the vocabulary of the speech recognition unit. The user can then select one of the teams by pushing a displayed button or by uttering the respective keyword. The selection made by the user is detected and the vote of the user is transmitted to the broadcaster via a back channel for counting and evaluating.

The invention can be used e.g. for electronic program guides or arbitrary other user interfaces of consumer electronic apparatuses but also for user interfaces of any other apparatus.

What is claimed is:

1. A method for modifying a user interface of a consumer electronic apparatus, said user interface controlling an interaction between a user and said consumer electronics apparatus, characterized by
    receiving side information comprising side information components for modifying a functionality of said user interface and validity information defining a validity of said side information components;
    storing said side information components and said validity information;
    modifying a way in which said user can provide input into said user interface by using said stored side information components; and
    controlling a start time and/or an end time of said user interface modification by means of said stored validity information.

2. The method according to claim 1, wherein said side information components are used for modifying an appearance and/or behavior and/or functionality of said user interface.

3. The method according to claim 2, wherein said side information components serve to temporarily implement new sub-directories with additional commands for said user interface.

4. The method according to claim 1, wherein said validity information defines a start and/or an end time of said side information components and wherein a storage time of said side information components is individually controlled for said side information components by said validity information.

5. The method according to claim 1, wherein said user interface is speech-controlled and said side information components comprise speech keywords for temporarily upgrading a vocabulary of speech recognition.

6. The method according to claim 1, wherein said user interface outputs a synthetic voice using a voice synthesis and said side information components comprise speech keywords as parameter sets for the voice synthesis.

7. The method according to claim 1, wherein said side information is received embedded into main audio/video data, and are extracted from said main audio/video data after reception.

8. The method according to claim 7, wherein said main audio/video data is an analog or a digital TV signal, and wherein said side information components are received embedded in a vertical blanking interval of the analog TV signal or in a corresponding data channel of the digital TV signal.

9. The method according to claim 1, wherein said side information is received on a separate input channel.

10. The method according to claim 1, wherein said validity information encompasses program identification information to qualify in a context of which program said side information is assumed valid.

11. The method according to claim 1, wherein said side information components are received upon a request of the user.

12. The method according to claim 1, wherein said side information components are received upon a request of a service provider.

13. A consumer electronic apparatus having a user interface with user command input means, said user interface controlling an interaction between a user and said consumer electronic apparatus,
    characterized by
    receiving means for receiving side information comprising side information components for modifying a functionality of said user interface and validity information defining a validity of said side information components;
    storage means for storing said side information components and said validity information;
    modifying means for modifying a way in which said user can provide input into said user interface by using said stored side information components; and
    controlling means for controlling a start and/or an end time of said user interface modification by means of said stored validity information.

14. The consumer electronic apparatus according to claim 13, wherein said user interface comprises a speech-control unit and wherein a vocabulary of a speech recognition unit of said speech-control unit is temporarily upgraded by using speech keywords received as side information components.

15. The consumer electronic apparatus according to claim 13, wherein said user interface comprises a voice synthesis unit and wherein speech keywords received as side information components are used as parameter sets for the voice synthesis unit.

16. The consumer electronic apparatus according to claim 13, wherein the receiving means comprises means for extracting said side information from main audio/video data after reception.

17. A non-transitory computer readable medium configured with a composition of audio/video data, side information components and validity information,
    said audio/video data being designated for display together with a user interface,
    said side information components being designated for modifying the functionality of said user interface, wherein a way in which a user can provide input into said user interface is modified, and
    said validity information being designated for controlling a start time and/or an end time of said user interface modification.

* * * * *